I. MERRILL.

Hook-Attachments for Stacking Fire-Arms.

No. 6,021. Reissued Aug. 18, 1874.

Witnesses:

M P Knowlton

Chas L Lang

Inventor:

Ira Merrill

THE GRAPHIC CO. PHOTO-LITH. 39 & 41 PARK PLACE, N.Y.

UNITED STATES PATENT OFFICE.

IRA MERRILL, OF SPRINGFIELD, MASSACHUSETTS.

IMPROVEMENT IN HOOK ATTACHMENTS FOR STACKING FIRE-ARMS.

Specification forming part of Letters Patent No. 137,786, dated April 15, 1873; reissue No. 6,021, dated August 18, 1874; application filed June 4, 1874.

*To all whom it may concern:*

Be it known that I, IRA MERRILL, of the city of Springfield, State of Massachusetts, have invented a Hook for Stacking Arms, of which the following is a specification:

The object of my invention is to furnish to guns, muskets, rifles, and carbines a device by means of which they can be easily and strongly stacked; and it is intended that this device should take the place of the triangular bayonet or the ramrod in stacking arms. The invention consists of a hook placed on any convenient part of the upper portion of the gun, so that it may be hooked either into the gun-sling swivel or into corresponding hooks on other guns, thus securing the arms together, and forming a tripod, upon which other guns may be placed to complete the stack.

There is a large variety of ways that this invention may be made and applied, so that it would be almost impossible to describe them all. In the annexed drawing I show one way.

Figure 1:
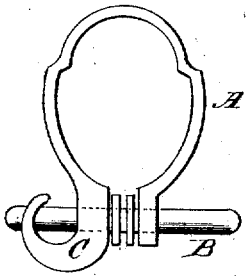
Figure 2:
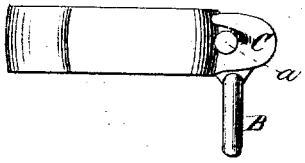
Figure 3:
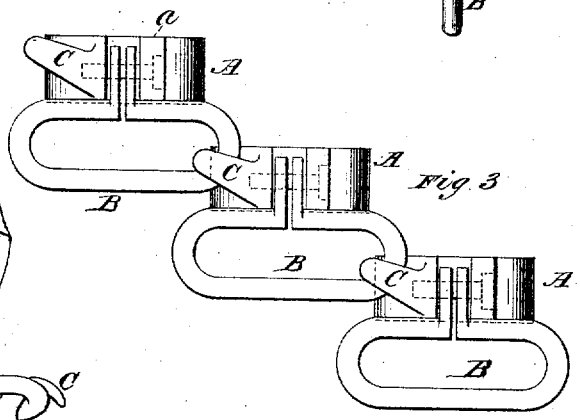
Figure 4:
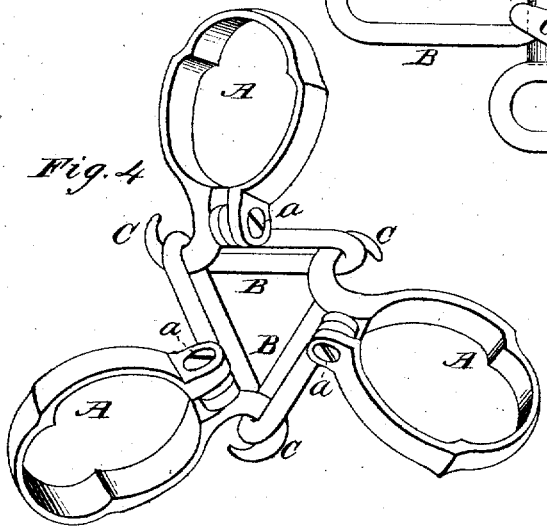

Figure 1 is a plan view of my invention as applied to the band of a gun-barrel. Fig. 2 is a side view of the same. Fig. 3 is a rear view of the same, and shows also the manner of securing the hooks in the rings or swivels in the operation of stacking three guns together to form a tripod for a larger number; and Fig. 4 shows the swivels and hooks as secured together to form the tripod.

In the drawing, A represents the band, which secures the stock to the barrel near the muzzle. This band is made in the usual manner, and with the common swivel B attached with the screw *a*, except that one end of the band where the swivel is secured is elongated and bent in the form of a hook, as shown in Fig. 1 at C. This hook is slightly inclined upward, as shown at Figs. 3 and 4.

In the operation of stacking arms, guns are first secured together by placing the hook of one into the swivel of the next gun, as shown at Fig. 3. After two have been attached together, their butts are placed apart, and the third is then attached, and the unattached hook is brought round and hooked into the unoccupied swivel, and the butts of the guns spread out in the form of a triangle. This operation brings the bands, with the hooks and swivels, into the position shown at Fig. 4, in which position, if the bands were in place upon the guns, the latter would form a tripod against which to set other guns in the operation of stacking.

I claim as my invention—

A hook in combination with a gun, and connected therewith near the muzzle, so as to serve as a means for stacking arms.

IRA MERRILL.

Witnesses:
M. P. KNOWLTON,
CHAS. L. LONG.